Dec. 18, 1956  W. A. RAY ET AL  2,774,847
CIRCUIT CONTROLLER FOR AIR HEATING CONTROL SYSTEM
Filed Feb. 7, 1955  2 Sheets-Sheet 1

INVENTORS,
WILLIAM A. RAY
EVAN J. DAVIDSON
WILLIAM F. KELLER
BY ARTHUR P. SWIFT
Flam and Flam
ATTORNEYS.

Dec. 18, 1956     W. A. RAY ET AL     2,774,847
CIRCUIT CONTROLLER FOR AIR HEATING CONTROL SYSTEM
Filed Feb. 7, 1955     2 Sheets-Sheet 2
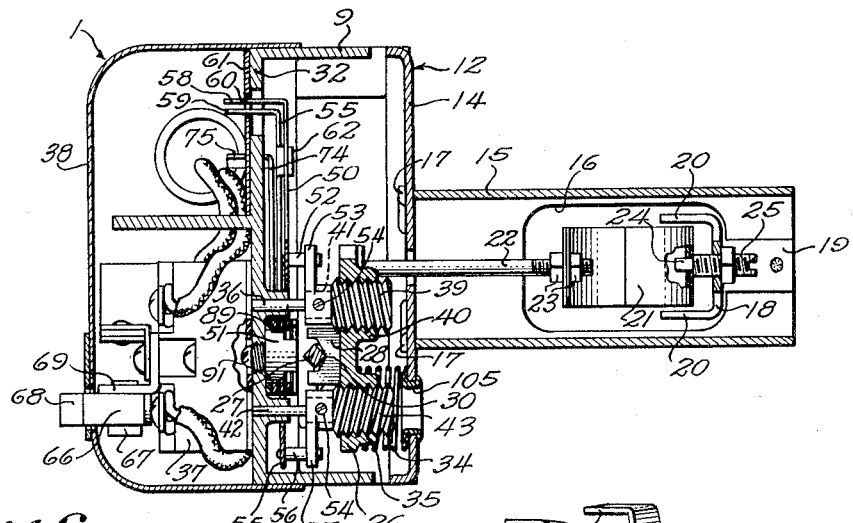
INVENTORS,
WILLIAM A. RAY
EVAN J. DAVIDSON
WILLIAM F. KELLER
BY ARTHUR P. SWIFT
Flam and Flam
ATTORNEYS.

United States Patent Office 2,774,847
Patented Dec. 18, 1956

2,774,847

CIRCUIT CONTROLLER FOR AIR HEATING CONTROL SYSTEM

William A. Ray, North Hollywood, Evan J. Davidson, Glendale, William F. Keller, Covina, and Arthur P. Swift, Woodland Hills, Calif., assignors to General Controls Co., Glendale, Calif., a corporation of California Application February 7, 1955, Serial No. 486,538

14 Claims. (Cl. 200—139)

This invention relates to the production of a stream of heated air, as by the aid of a fuel burner. In many of these installations adopted for heating a room, a fan is provided for forcing the heated air through the air ducts or the plenum.

When the fuel burner becomes active upon a demand for more heat (as by a thermostat control), the operation of the fan is delayed until the air is first heated to a prescribed value. In this way, premature flow of cold air into the room is prevented. When the fuel burner is shut down, upon the desired room temperature being attained, the de-energization of the fan is delayed, so as to be sure that all of the heated air is evacuated from the plenum or duct.

Control systems of this general character are now in common use.

It is one of the objects of this invention to provide a simple mechanism for the control of the fan and the operation of the heating means.

It is still another object of this invention to make it possible to adjust the temperature at which the heater is rendered operative and inoperative without affecting the operation of the thermostatic element; and particularly to make it possible to use an axially movable rod or the like for transmitting the force of the thermostat element to the control device.

It is another object of this invention to provide a simple adjusting means to determine the temperature differential at which the fan is caused to be energized and de-energized.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 5 is a sectional view taken along a plane corresponding to line 5—5 of Figs. 2 and 4;

Fig. 6 is a sectional view taken along a plane corresponding to line 6—6 of Fig. 4;

Fig. 7 is an exploded pictorial view of the temperature setting mechanism and its mounting; and Fig. 8 is a wiring diagram of a system incorporating the circuit controller.

Figure 1:
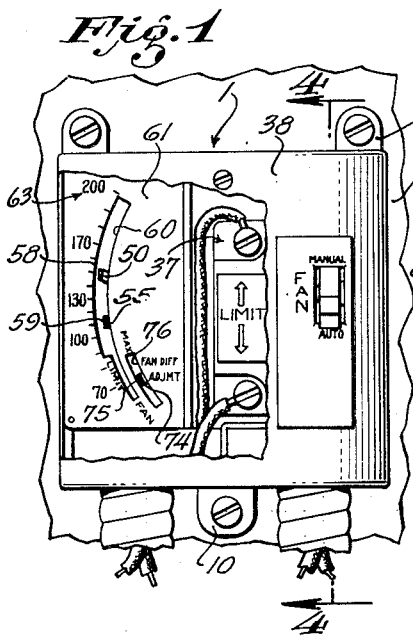
Figure 1 is a front elevation of a circuit controller incorporating the invention, a portion of the cover being broken away, and shown as installed in a wall of a hot air duct or plenum.

The circuit controller device 1, shown in Figs. 1 to 5, is diagrammatically illustrated in Fig. 8. The system of Fig. 8 illustrates an electromagnetically operated valve 2, adapted to supply fuel to a burner for heating a room or the like. A fan blower motor 3 is also indicated. The circuit controller device 1 is arranged to correlate the operation of the fan motor 3 with the operation of the valve 2.

Thus, for example, the control circuit for the valve 2 includes the secondary winding 4 of a transformer 5. The primary winding 6 of the transformer is arranged to be fed from mains 7. The circuit for the valve 2 includes as well a room thermostat 8 and a limit switch structure embodied in the device 1. Accordingly, in order for the valve 2 to be opened it is necessary for the room thermostat 8 to close its circuit and the limit switch incorporated in the device 1 must be closed.

In the event the temperature in the air duct or plenum reaches a high limiting value, the limit switch opens the circuit for the gas valve 2 and remains open until the temperature reaches a safe value.

Similarly, the fan motor 3 is controlled so that it is energized from mains 7 through a snap switch incorporated in device 1. This energization occurs when the temperature of the air in the plenum or duct reaches a sufficiently high value; and the blower motor 3 is automatically de-energized when the temperature in the plenum or duct is reduced below that value.

Figure 2:
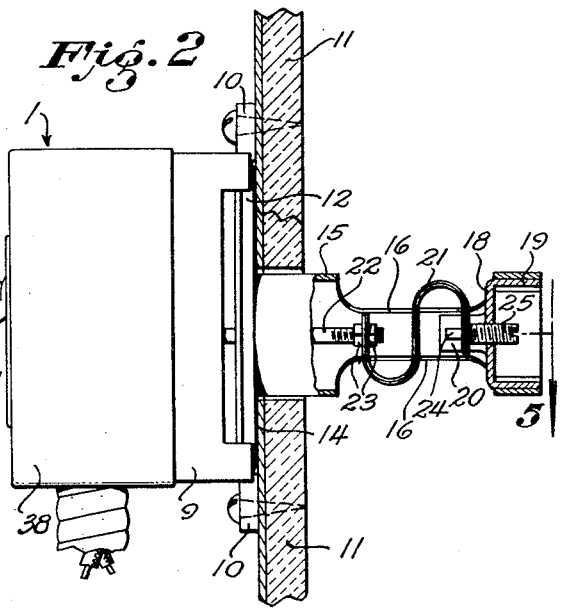
Fig. 2 is a side elevation thereof, partly in section.

The housing for the controller 1 includes a base or back case 9 made of metal, such as aluminum alloy, and of general rectangular configuration. It is provided with feet 10 by the aid of which it may be properly mounted upon the exterior side of the plenum wall 11. In Fig. 2 the duct or plenum is arranged on the right hand side of the wall 11. The back case 9 is open adjacent the wall 11.

Figure 3:
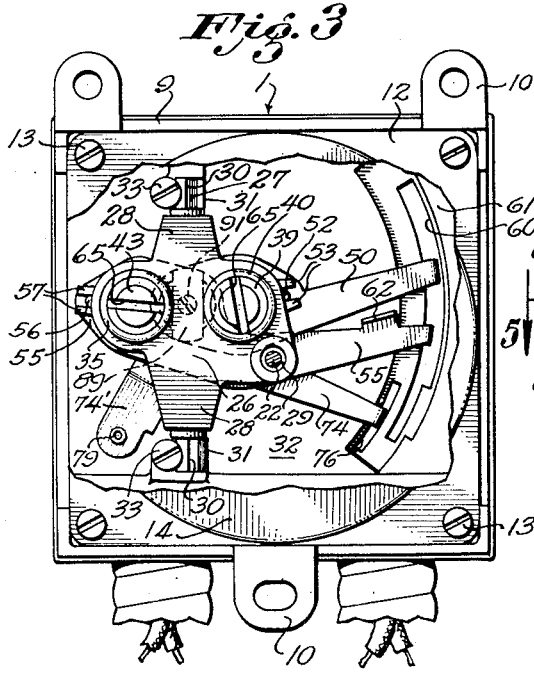
Fig. 3 is a rear view of a circuit controller, a part of the casing being broken away.

A mounting plate 12, shown most clearly in Fig. 3, is attached as by screws 13, to bosses formed in the back case 9. This mounting plate is adapted to carry the thermostat structure which is subjected to the temperature in the plenum. It is provided with a cylindrical portion 14 projecting rearwardly adjacent the wall 11, as shown in Fig. 2. This cylindrical projection serves to support a thermostat structure within the duct. This thermostat structure includes a cylindrical body member 15 (Figs. 2 and 5) having diametrically opposite wide slots 16 for free circulation of air transversely across tubular structure 15.

The left-hand end of the tubular structure 15 is provided with ears 17, adapted to enter into corresponding apertures in the cylindrical portion 14 and be turned radially outwardly on the left hand of the cylindrical extension 12. These ears 17 serve to support the cylindrical structure 15 in place upon the cylindrical portion 14.

Supported within the right-hand part of the tube 15 is a guide member 18 for a bi-metal element. This guide member is provided with a pair of diametrically opposite arms 19 engaging the interior of the tube 15, and spot welded thereto. The guide 18 also has diametrically opposite arms 20, serving to confine and guide an S-shaped bi-metal member 21. This bi-metal member 21 is mounted at its left-hand end upon a push rod 22, as by the aid of the nuts 23. Its right-hand end is apertured for the reception of the cylindrical extension 24 of an adjustment screw 25. This adjustment screw, as shown most clearly in Fig. 5, is threaded through the member 18 and may be adjusted to determine the initial position of the thermostat structure.

As well known, this thermostat structure is so made that the inner portions of the arcs are formed of one metal, and the outer portions are formed of another metal. Upon an increase in temperature, the bi-metal member expands in a direction axially of the rod 22.

Figure 4:
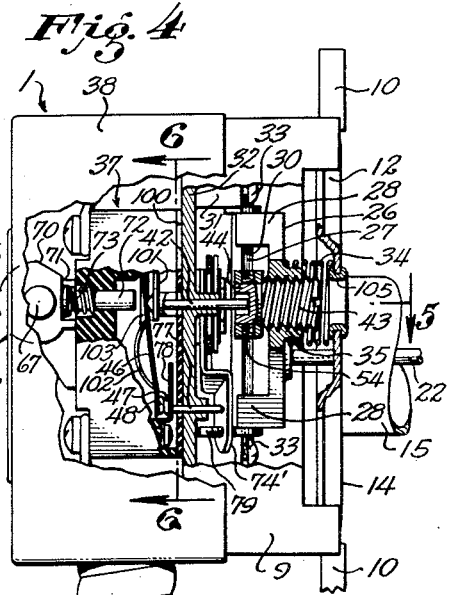
Fig. 4 is a sectional view taken along a plane corresponding to line 4—4 of Fig. 1.

This axial movement, corresponding to an increase in temperature in the plenum, causes ultimately a deenergization of the electromagnet operating the valve 2. For this purpose, the push rod 22 extends through an opening in the portion 12 in order to tilt a rocker 26. This rocker is mounted for tilting on a corner of a rectangular or square bar 27 (see especially Fig. 5) by the aid of projections 28 at opposite ends of the rocker 26 (Figs. 3 and 4). The bar 27 thus acts as a fulcrum pin. The push rod, as shown most clearly in Fig. 3, is received in a recess 29, formed in the rocker 26. Accordingly, push rod 29 causes the rocker 26 to tilt whenever this rod has a sufficient movement. The right-hand portion of the rocker 26 in the position of Fig. 3 is tilted downward, and the left-hand portion is tilted upwardly about an axis 30 corresponding to the corner of the bar 27. Fulcrum pin 27 is attached to bosses 31 carried by the wall 32 of the back base 9. This is accomplished by the aid of the screws 33.

A resilient force opposes tilting of the rocker 26. This resilient force is created by a compression spring 34 (Figs. 4 and 5). The left-hand end of this compression spring surrounds a boss 35 formed on the rocker 26 (see, especially, Fig. 3). The right-hand end of the compression spring is confined by the end wall of the mounting plate 12.

Tilting of the rocker 26 in a counterclockwise direction, as viewed in Fig. 5, urges an actuator 36 inwardly, for opening a switch to deenergize the electromagnet operating valve 2. This switch is located in a switch assembly 37, mounted on the left-hand side of the wall 32. An insulation sheet 100 (Fig. 4) is interposed between the switch assembly 37 and wall 32. This switch assembly is enclosed by a cover 38 telescoping over the back base 9.

It is sufficient for the present to note that movement of the actuator 36 toward the left, as viewed in Fig. 5, causes a snap switch to open. Release of the actuator 36 so that it may move toward the right causes the switch to close.

The opening and closing of the snap switch are effected respectively by expansion and contraction of the bimetal element 21, which causes the push rod 22 to move toward the left or to the right, as viewed in Fig. 5. Opening of the switch occurs only upon attainment of an undesired high temperature in the plenum.

The mechanical connection between the actuator 36 and the rocker 26 is effected by the aid of a range screw 39 threaded into a boss 40 of the rocker 26. This range screw has an extension 41 in which there is a recess permitting entry of the right-hand end of the actuator 36. Sufficient clearance is provided between the recess and the actuator 36 so that slight tilting of the rocker may occur before the actuator is operated.

Snap switches of the character utilized in this system are so arranged that the actuator 36 must be moved by a definite amount before the switch is operated. In order to adjust the amount of tilting necessary to produce this motion of the actuator 36, the range screw 39 is adjustable within the boss 40. Rotation of the screw in one direction or the other will cause relative movement between it and the rocker. The manner in which this adjustment is effected so as to determine at what temperature the limit switch is opened will be described hereinafter.

Another snap switch mechanism, mounted adjacent the limit switch, is utilized for controlling the blower motor 3. This snap switch mechanism is shown in Figs. 4 and 6. It includes the actuator 42 urged toward the left by the range screw 43, which is threaded into boss 35. This range screw, as shown most clearly in Fig. 4, is provided with a recessed cylindrical portion 44. When the system is inactive, the bottom surface of this recess is urged by the force of spring 34 to engage the actuator 42, urging the actuator toward the left, as viewed in Figs. 4 and 5, and opening the contacts 47 and 48. Upon retraction of this actuator 42, these contacts are in engagement. This corresponds to a tilting of the rocker 26 in a counterclockwise direction upon a sufficient increase in temperature in the plenum. In normal operation of the system, the switch is in the position of Fig. 4, causing energization of motor 3.

The snap switch structure controlling the fan motor 3 is appropriately incorporated in the switch assembly 37. The actuator rod 42 is provided at its left-hand end with a member 101 having a knife edge for contacting the central leaf 46 of a leaf spring structure. On each side of the central leaf, and formed integrally therewith, are the bowed spring elements 102 (Fig. 6). The upper edges of these elements 102 engage in notches formed in the stationary rigid member 103, these notches thus forming a pivot point.

When the actuator rod 42 is urged a sufficient distance toward the left the bowed elements 102 snap over center about the pivot formed by the notch in member 103 to a position in which the contact members 47 and 48 are opened. Similarly, when the actuator rod 42 is moved sufficiently toward the right, the bowed elements 102 are permitted to flex in the opposite direction to cause engagement of the contacts 47 and 48.

The temperature at which the limit snap switch is operated to open and close may be determined by adjustment of the range screw 39 within boss 40. This is effected by a lever 50 (see also Fig. 7). This lever 50 is mounted for free rotation upon a pivot hub 51. This pivot hub serves to mount several other levers, as will be described in detail hereinafter.

The lever 50 carries a pin 52 operating in a fork 53, mounted on the cylindrical extension 41 of the range screw 39, as by the aid of diametrically opposite set screws 54. Accordingly, movement of the lever 50 causes corresponding angular movement of the range screw 39. In turn, this positions the bottom of the recess in the range screw either toward or from the actuator 36. It is thus possible to adjust the temperature at which the limit switch is opened.

Range screw 43, determining the temperature at which the snap switch that controls the blower motor 3 closes, is adjustable by the aid of a lever 55 upon which a pin 56 is mounted. This lever 55 is also pivoted on pivot 51. Pin 56 operates a fork 57 which is mounted upon a cylindrical extension of range screw 43.

Both of these levers 50 and 55 have bent ends 58 and 59. These bent ends, as shown most clearly in Figs. 1, 3 and 5, project through a slot 60 formed on a scale plate 61 attached to the left-hand surface of wall 32 of back case 9. Furthermore, the blower motor controlling lever 55 has a supplemental bent portion 62, which limits the approach of the lever 55 to lever 50.

As shown in Fig. 1, the scale plate 61 carries the dial markings 63 cooperating with the ends of these levers, to assist in the adjustment of both range screws.

When the room thermostat demands heat, the rocker 26 is in its extreme clockwise position as viewed in Fig. 5; the limit switch is closed, and the valve 2 is open. Upon expansion of thermostat 21, the rocker 26 is tilted sufficiently in a counterclockwise direction to permit engagement of contacts 47 and 48, energizing blower motor 3. Now if the temperature in the plenum reaches a high limiting value, the limit switch is opened. In normal operation, the limit switch remains closed, and the blower motor 3 remains energized.

For calibration purposes, each of the range screws 39 and 43 may be adjusted independently of the corresponding levers 50 and 55. For this purpose, these range screws are provided with slots 65 for accommodation of a screw driver. This adjustment may be effected upon loosening of the set screws 54, that hold the forks 53 and 57 on the cylindrical extensions of the range screws.

Access to range screw 43 is effected through aperture 105 (Fig. 5) in member 12.

Optionally, the blower motor 3 may be energized independently of the position of the rocker 26, as well as of the operation of the heater. Thus, as indicated most clearly in Figs. 2, 4, and 5, a manual operator 66 is pivotally mounted by the aid of a pin 67 and has a digitally controlled handle 68. The pivot pin 67 may be appropriately mounted on a bracket structure 69, supported on the casing of circuit controller 37.

The operator 66 is generally circular, but has two flat surfaces 70 and 71. The flat surface 70 is at a greater radial distance from the axis of the operator than the surface 71. In the position of Fig. 4, surface 71 is active to limit movement of a pin 72 longitudinally guided in the wall 32 of switch assembly 37. The left-hand end of this pin carries a head, which is urged against the flat surface 71 by the aid of a compression spring 73 located in a recess in switch assembly 37 and surrounding pin 72.

In this position, movement of the leaf spring 46 is unimpeded, so that the contacts 47 and 48 are under exclusive control of the actuator 42.

When the operator 66 is moved in a clockwise position from that shown in Fig. 4 so as to position the surface 70 normal to the axis of the pin 72, this pin 72 is urged toward the right, and is held in that position by the surface 70. In the inwardly directed position, the pin 72 engages the leaf spring arm 46 and this leaf spring arm is prevented from movement. The contact points 47 and 48 are thus kept in continuous engagement while the surface 70 is active and the blower motor 3 is thus energized.

By the aid of a third lever 74 it is possible to adjust the temperature at which the blower motor 3 is de-energized. Thus, for example, if the gas valve 2 closes by operation of the thermostat 8, the blower motor 3 will remain energized until the temperature of the air in the plenum is reduced by a definite amount.

Lever 74 effects the adjustment of this fan differential, determining the extent to which the temperature in the plenum must be reduced to open the contacts 47, 48. This lever 74 is provided with a bent end 75 projecting through a slot 76 in the scale plate 61.

The lever 74 is pivotally mounted upon the pivot member 51 for manual angular adjustment.

The lever 74 is provided with an end portion 74' (see Figs. 3, 4 and 7) having a lower surface which is inclined to the wall 32. This lower surface cooperates with a push pin 77 (Figs. 4 and 6) engaging a leaf spring 78 upon which contact member 47 is mounted. Angular movement of lever 74 thus causes the inclined member 74 to urge the pin 77 toward the left, or to release the pin.

When the lever 74 is moved so as to urge the push pin 77 inwardly, contact member 48 is moved toward the left, nearer the position in which the bowed element 102 of the snap switch can snap over to operate and open the motor circuit. Accordingly, this serves to reduce the temperature differential, since the actuator 42 need be moved a shorter distance to the left to cause the switch to open.

Similarly, movement of the lever 74 in the opposite direction permits the push pin 77 to move toward the right. In this event, the temperature differential is increased.

An additional calibrating adjustment of the inclined member 74' is provided. For this purpose, a stud 79 is adjustably mounted in the inclined portion 74' of lever 74. Its left-hand end, as viewed in Fig. 4, abuts the left-hand side of wall 32. By adjusting this stud, the position of the end portion 74' with respect to wall 32 is adjusted. Thus it is possible to calibrate the lever operation. An opening 110 in lever 55 permits access to pin 42.

The mounting of the three levers 50, 55 and 74, upon the pivot member 51, may now be described.

Fig. 7 shows the pivot member threadedly engaging the wall 32. A washer 80 is interposed between wall 32 and the hub of lever 74. Then a washer 81 is likewise disposed over the pivot member 51, with two inwardly extending projections 82. These projections engage the deep narrow portion 83 of a slot in pivot member 51. Due to the engagement of these projections 82 in the bottom of the slot, the lever 74 is provided with sufficient clearance for ready rotation about the pivot member 51, between the spaced washers 80 and 81.

Lever 55 is next disposed on the hub 51, and is adjacent washer 81. Another washer 84, identical with washer 81, is now disposed in the narrow portion of slot 83. The lever 50 is next disposed over the pivot member 51. A washer 85, having wider projections 86, is disposed so that it abuts the shoulder 87 formed between the narrow slot 83 and the wide slot 88. This shoulder 87 thus determines the spacing between washers 81 and 84, to provide running clearance for lever 55 and 75. It also determines the spacing between the washers 84 and 85, to provide a running clearance for the lever 50.

The washer 85, resting upon the shoulder 87, is engaged by the lock member 89, which has flat sides 90 entering the wide slot 88. A screw 91, passing axially through the pivot member 50, engages a threaded aperture 92 of the lock 89. This screw 91 may be tightened to hold the assembly in place.

The inventors claim:

1. In a control mechanism: a first circuit controller; a second circuit controller; a tiltable member for operating either of the circuit controllers in accordance with the direction of tilting; a longitudinally movable push rod for tilting the member; adjustable means carried by the member for determining the extent of movement of the rod for tilting the member; and a condition responsive device for operating said rod.

2. In a control mechanism: a first circuit controller; a second circuit controller; a tiltable member for operating either of the circuit controllers in accordance with the direction of tilting; a longitudinally movable push rod for tilting the member; and means carried by the member for adjusting the tilt of the member by the push rod at which one of the circuit controllers operates, comprising a nut member, a screw member, and a lever for causing relative motion between the nut and screw members.

3. In combination: a first circuit controller; a second circuit controller; a bar having a longitudinally extending edge, the controllers being on opposite sides of said edge; a member tiltably mounted on said edge and having arms for operating said controllers in accordance with the direction of tilt; means on one side of the edge resiliently urging the member in one direction of tilt; and means engaging the member on the other side of the edge for moving the member in the opposite direction; said moving means and said urging means maintaining said member in engagement with said edge.

4. In combination: a first circuit controller; a second circuit controller; a bar having a longitudinally extending edge, the controllers being on opposite sides of said edge; a member tiltably mounted on said edge and having arms for operating said controllers in accordance with the direction of tilt; means on one side of the edge resiliently urging the member in one direction of tilt; and condition responsive means engaging the member on the other side of the edge for moving the member in the other direction; said condition responsive means and said urging means maintaining said member in engagement with said edge.

5. In combination: a circuit controller having a contact carrying arm, as well as movable condition responsive means for snapping said arm between open-circuit and closed-circuit positions; and means optionally restraining movement of said movable means, for retaining said arm in one of its two positions.

6. In combination: a circuit controller having a resilient contact carrying arm that may be rapidly moved from one position to another to perform a switching operation; an operator contacting said arm for urging said arm to cause it to move rapidly upon a sufficient movement of said operator; a movable abutment on the opposite side of the arm for optionally restraining movement of the arm; and condition responsive means for moving said operator.

7. In combination: a circuit controller having a resilient contact carrying arm that may be rapidly moved from one position to another to perform a switching operation; an operator contacting said arm for urging said arm to cause it to move rapidly upon a sufficient movement of said operator; and means adjusting the position of the arm so as to adjust the degree of movement of said operator to cause it to operate the arm, comprising a push rod; and an angularly adjustable cam for urging the rod toward the arm.

8. In a control mechanism: a pivoted rocker; means angularly positioning the rocker as a function of a condition; a switch; a member for operating the switch; a range screw cooperating with the member for determining the position of the rocker corresponding to operation of the switch; a manually operable movable setting arm; and a connection between the setting arm and the range screw for positioning the range screw in accordance with the position of the setting arm.

9. In a control mechanism: a pivoted rocker; means angularly positioning the rocker as a function of a condition; a switch; a member for operating the switch; a range screw cooperating with the member for determining the position of the rocker corresponding to operation of the switch; a crank arm; means securing the crank arm to the range screw in an angularly adjusted position relative to the range screw; an angularly adjustable setting arm; and a pin and slot connection between the setting arm and the crank arm.

10. In a control mechanism: a pivoted rocker; means angularly positioning the rocker as a function of a condition; a pair of snap switches; operating members respectively for the snap switches; range screws cooperating with the members for determining the positions of the rocker corresponding to snap-over of the respective switches; a manually operable movable setting arm for each range screw; and connections between the setting arms and the respective range screws for positioning the range screws respectively in accordance with the positions of the setting arms.

11. In a control mechanism: a snap switch having an arm pivoted at one end, the other end being movable; resilient means determining a snap movement of the arm angularly about its pivotal mounting; and adjustable means limiting angular movement of the arm in one direction to control the extent of angular movement necessary to move the arm between opposite positions, comprising a push rod and a lever having a cam surface engageable with the rod for urging the rod toward the arm.

12. In a control mechanism: a snap switch having an arm pivoted at one end, the other end being movable; resilient means determining a snap movement of the arm angularly about its pivotal mounting; adjustable means limiting angular movement of the arm in one direction to control the extent of angular movement necessary to move the arm between opposite positions, comprising a push rod and a lever having a cam surface engageable with the rod for urging the rod toward the arm; and an adjustable calibrating post for flexing the lever to move the cam away from the rod.

13. In a control mechanism: a support; a snap switch having a flexible arm secured at one end to the support; said arm having a bow spring struck from the arm, the bow spring having a free end; means forming a seat for the free end of the bow spring to provide a snap movement of the arm; said arm having a free end; a flexible resilient member located in the path of movement of the free end of said arm; contacts carried by the flexible member and the end of the arm; a push rod engageable with the flexible member for moving the flexible member toward the free end of the arm; and a setting lever having a cam engageable with the rod for moving the rod in accordance with the angular position of the lever.

14. In a control for a heating system having a heating element, motor driven fan and heating duct: a longitudinally movable thermo-responsive element located in the duct and responsive to the temperature in the duct; a rocker tiltable about an axis; means maintaining the rocker in following relationship with the thermo-responsive element for angular orientation of the rocker in accordance with the temperature in the duct; two snap switches on one side of the rocker and located on opposite sides of the axis of the rocker, each operable between stable positions by overcenter movement; operators for each of the snap switches and respectively adjustably connected to opposite sides of the rocker; means cooperating with one snap switch for preventing operation of said heating element upon a predetermined angular movement of the rocker; an energization circuit for the fan dependent upon the other snap switch, an operative upon another predetermined angular movement of the rocker; said other snap switch having a relatively stationary flexible contact carrying arm; a rod engageable with the flexible arm determining the extent of overcenter movement of the other snap switch when said other snap switch is in closed position; and means adjusting the position of the rod to vary the differential movement of the rocker necessary to operate the other snap switch.

References Cited in the file of this patent

UNITED STATES PATENTS

| | | |
|---|---|---|
| 1,445,847 | Platt | Feb. 20, 1923 |
| 2,041,246 | Hart | May 19, 1936 |
| 2,120,937 | Kronmiller | June 14, 1938 |
| 2,486,443 | Smith | Nov. 1, 1949 |